(12) United States Patent
Morii et al.

(10) Patent No.: US 6,461,660 B2
(45) Date of Patent: Oct. 8, 2002

(54) METHODS OF ENHANCING PUFFING AND EXPANSION OF FOOD PRODUCTS

(75) Inventors: Kazuaki Morii, Sakurai (JP); Kiyoshi Morii, Sakurai (JP); Simpey Kuramoto, Allendale, NJ (US); Roland Abate, Allendale, NJ (US)

(73) Assignees: Wynn Starr Flavors, Inc., Allendale, NJ (US); Morii Foods Co., Ltd., Sakurai (JP)

( * ) Notice: Subject to any disclaimer, the term of this patent is extended or adjusted under 35 U.S.C. 154(b) by 0 days.

(21) Appl. No.: 09/812,803

(22) Filed: Mar. 20, 2001

(65) Prior Publication Data

US 2002/0058093 A1 May 16, 2002

Related U.S. Application Data

(60) Provisional application No. 60/235,732, filed on Sep. 27, 2000, provisional application No. 60/241,866, filed on Oct. 20, 2000, and provisional application No. 60/276,374, filed on Mar. 16, 2001.

(51) Int. Cl.$^7$ ................................................. A21D 13/00
(52) U.S. Cl. ........................ 426/559; 426/241; 426/242; 426/445
(58) Field of Search ........................... 426/94, 559, 241, 426/242, 446, 450, 234, 237, 445

(56) References Cited

U.S. PATENT DOCUMENTS

| 4,844,937 A | * | 7/1989 | Wilkinson et al. | 426/559 |
|---|---|---|---|---|
| 4,950,492 A | * | 8/1990 | Shachat et al. | 426/243 |
| 4,965,081 A | * | 10/1990 | Lazarus | 426/242 |
| 5,102,679 A | * | 4/1992 | Whalen | 426/549 |
| 5,108,772 A | * | 4/1992 | Wilbur | 426/559 |
| 5,165,950 A | * | 11/1992 | Boehmer et al. | 426/559 |
| 5,200,222 A | * | 4/1993 | Schwab et al. | 426/241 |
| 5,558,890 A | * | 9/1996 | Brown et al. | 426/94 |
| 6,083,552 A | * | 7/2000 | Kershman et al. | 426/559 |
| 6,171,631 B1 | * | 1/2001 | Willoughby et al. | 426/559 |

* cited by examiner

Primary Examiner—Lien Tran
(74) Attorney, Agent, or Firm—Reed Smith LLP

(57) ABSTRACT

Methods for producing food products having an enhanced microwaveability are disclosed. The methods comprise preparing a food product mixture which is comprised of at least a food product and water, adding a seasoning to the mixture and shaping the mixture in a form suitable for microwaving such that the mixture has a moisture content in the range from about 1% to about 20% by weight of the mixture. Food products prepared by the mixture are also disclosed.

14 Claims, No Drawings

METHODS OF ENHANCING PUFFING AND EXPANSION OF FOOD PRODUCTS

This application claims priority from U.S. Provisional Patent Application Ser. No. 60/235,732, filed Sep. 27, 2000, and U.S. Provisional Patent Application Serial No. 60/241,866, filed Oct. 20, 2000, U.S. Provisional patent application Ser. No. 60,276,374 filed Mar. 16, 2001, the contents of each of which are incorporated herein by reference.

BACKGROUND OF THE INVENTION

The present invention is directed to methods of enhancing food products. Specifically, the present invention is directed to methods of enhancing the puffing characteristics of microwaveable food products such as potatoes, mung beans, wheat, corn, soy beans, rice and rice powders, tapioca, bean starches and starches from other food products and food products obtained therefrom.

The market for microwaveable snacks focuses on popcorn which the consumer can easily prepare by "popping" a bag of popcorn immersed in butter flavored oil and salt in the microwave for 2 to 4 minutes. The basis for popping is the retention of moisture in the corn, which "explodes" in the microwave with a popping sound and thereby "gelatinizes" the carbohydrates in an expanded state.

There are many known processes for preparing microwaveable snack products. For example, U.S. Pat. No. 5,108,772 issued to Wilbur (hereinafter referred to as "the '772 patent") discloses microwaveable poppable pellets and their methods of preparation. The '772 patent discloses that a disadvantage associated with substituting puffable pellets for popcorn in the microwave snack is the lack of a sound cue to indicate completion of the microwave-heating step. Thus, a consumer would have to rely on visual cues to determine the completion of the microwave-heating step. The '772 patent addresses this problem, however, the microwave snacks prepared according to the '772 patent resemble that of popcorn kernels. Food products prepared from known processes such as the process disclosed by the '772 patent lack preferred microwaveability and puffing characteristics.

Also, U.S. Pat. No. 6,083,552, issued to Kershamn, et al. (hereinafter referred to as "the '552 patent") discloses microwaveable snacks that include a mixture of popcorn and expandable or puffable food pellets. The '552 patent provides that several microwaveable products such as simulated popcorn and cheese-coated puffed snacks have not been available to consumers because of the difficulties experienced with heating these products in a microwave and the lack of a viable product due to the fact that puffable pellets do not expand uniformly and result in undesirable starch material which is part burned, part unpuffed and potentially under-cooked. Food products from known processes such as that disclosed by the '552 patent do not solve the fundamental problem of puffing pellets uniformly without combining popcorn and lack preferred puffing characteristics.

Accordingly, it is an object of the present invention to provide a method of preparing microwaveable food products wherein the microwaveable food product has enhanced microwaveability and puffing characteristics including uniform puffing characteristics with a popping sound cue to indicate completion of the microwave-heating step.

SUMMARY OF THE INVENTION

It has been unexpectedly found that adding acidic or salty seasonings to puffable food products during their preparation into microwaveable food products enhances the microwaveability and puffing characteristics of the expanded food product.

In particular, the present invention is directed to a method for preparing a food product having enhanced microwaveability and puffing characteristics. The method includes providing a food product mixture containing at least one food product and water, adding at least one seasoning to the mixture and preparing the mixture into an expandable composition. The expandable composition has a moisture content in the range of from about 1% to about 20% by weight of the composition.

Preferably, the moisture content of the composition is from about 8% to about 15% by weight of the composition. Even further preferably, the moisture content of the composition is from about 8% to about 12% by weight of the composition. Most preferably, the moisture content of the composition is about 12%.

Further, it is contemplated that several food products can be used in the method of the present invention. Such food products include, but are not limited to, potatoes, mung beans, wheat, corn, soy beans, rice and rice powders, tapioca, bean starches and starches from other food products. Preferably, the food product is 100% potato starch.

It is also contemplated that several different seasonings can be used in the method of the present invention. Preferably, the seasoning is selected from the group including salt, vinegar, barbeque seasoning, nacho seasoning, sour cream and onion seasoning, sweet and sour seasoning, sweet seasoning, hot and spicy seasoning, chicken flavor seasoning, savory flavor seasoning, MSG, HVP, Yeast Autolysates and flavor reaction products.

In a preferred embodiment of the present invention, the food product mixture includes a second food product. Preferably, the second food product is also selected from the group including potatoes, mung beans, wheat, corn, soy beans, rice and rice powders, tapioca, bean starches and starches from other food products.

In another preferred embodiment of the present invention, a second seasoning is added to the food product mixture. Preferably, the second seasoning is also selected from the group including salt, vinegar, barbeque seasoning, nacho seasoning, sour cream and onion seasoning, sweet and sour seasoning, sweet seasoning, hot and spicy seasoning, chicken flavor seasoning, savory flavor seasoning, MSG, HVP, Yeast Autolysates and flavor reaction products.

The present invention also provides for another method for preparing a food product having enhanced microwaveability and puffing characteristics including providing a food product mixture containing at least one food product and water, adding at least one seasoning to the mixture and preparing the mixture into an expandable composition having a moisture content in the range of from about 12% to about 14% by weight of the composition.

Another method for preparing a food product having enhanced microwaveability and puffing characteristics of the present invention includes providing a food product mixture containing at least one food product and water, adding a combination of two or more seasonings to the mixture and preparing the mixture into an expandable composition. The expandable composition has a moisture content in the range of from about 1% to about 20% by weight of the composition.

The combination of seasonings added to the food product mixture can include several seasonings selected from the group including salt, vinegar, barbeque seasoning, nacho seasoning, sour cream and onion seasoning, sweet and sour seasoning, sweet seasoning, hot and spicy seasoning, chicken flavor seasoning, savory flavor seasoning, MSG, HVP, Yeast Autolysates and flavor reaction products.

Accordingly, the present invention, unlike other inventions related to expandable food products, provides for producing uniformly puffable pellets without using expansion additives such as flavors, salt and baking soda, etc., but still obtains uniform puffability in a standard popcorn bag or the like. The present invention, however, also provides for preferred mouthfeel, texture and taste by mixing seasonings within the starch matrix whereas processes which provide for greater expandability do not always result in better mouthfeel, texture and taste. In particular, the combination of seasonings such as salt, vinegar, barbeque seasoning, nacho seasoning, sour cream and onion seasoning, sweet and sour seasoning, sweet seasoning, hot and spicy seasoning, chicken flavor seasoning, savory flavor seasoning, MSG, HVP, Yeast Autolysates and flavor reaction products are added to the starch matrix resulting in microwaveable snacks having preferred mouthfeel, texture and taste. Therefore, the present invention relates not only to methods of uniformly enhancing the expansion of food products with a popping sound but also to food products having preferred puffing characteristics and improved mouthfeel, texture and taste prepared by such methods.

DETAILED DESCRIPTION OF THE INVENTION

The following examples are provided to assist in further understanding the present invention. The particular materials and conditions employed are intended to be further illustrative of the invention and are not limiting upon the reasonable scope thereof.

EXAMPLE 1

A microwaveable food product of the present invention was prepared according to the following procedure. A mixture of 300 grams of potato starch, 20 grams of a salt and vinegar seasoning, and 250 cc water was prepared by using a jacket mixer.

The salt and vinegar seasoning had the following composition:

| Ingredient | Weight % of the Composition |
| --- | --- |
| Maltrin | 50.0 |
| Salt | 29.0 |
| Essicum Vinegar | 15.0 |
| Vinegar Powder | 3.0 |
| Citric Acid | 3.0 |

The mixture was then poured though a belt roller and sheets having a thickness of 2.0±0.7 mm were obtained. The sheets were then subjected to a steam process at 95 to 100° C. for 5 to 7 minutes to form alpha latices. The sheets were then cooled at 2 to 10° C. for 2 hours. After cooling, the sheets were die cut to form round pieces of 20 to 40 mm in diameter. The cut pieces were further dried to have a moisture content of 8 to 15% at a thickness of 2.0±0.7 mm. Although the potato food products prepared in this example had round shapes 20 to 40 mm in diameter, the creation of potato food products or any other food product of any shape and size, such as the shape of french fries, fried potatoes, etc., is contemplated by the present invention.

The potato food products prepared by this procedure had enhanced puffability and deep fat frying puffing characteristics. Deep fat frying at 350° F. or at a higher temperature as in frying french fries results in a unique texture and mouthfeel. The inclusion of seasonings such as spices, salt, sugar, etc. greatly enhances the puffability of fabricated starch based formulations.

EXAMPLE 2

A microwaveable food product of the present invention was prepared according to the following procedure.

A mixture of 190 grams of potato starch and 190 ml of water was prepared by using a jacket mixer for 4 to 6 minutes at temperatures from 55 to 70° C. A preferable temperature to prepare this mixture is 60° C.±2° C.

The mixture was then poured though a belt roller and sheets were formed. The sheets were then subjected to a steam process at 95 to 100° C. for 5 to 7 minutes to form alpha latices. The sheets were then cooled at 2 to 10° C. for 2 hours. After cooling, the sheets were die cut to form square, rectangular and round pieces. The cut pieces were further dried to have a moisture content of 8 to 15%, preferably 12 to 14%, at thicknesses of 0.4 to 2.0 mm, preferably 0.9 to 1.4 mm, in a drying room at 40 to 45° C. for 2 to 2½ hours. Although the potato food products were prepared in square, rectangular and round shapes, food products can be cut in any other shape such as the shape of french fries, fried potatoes, squirrel shapes, etc.

The potato food products prepared by this procedure had enhanced puffability and deep fat frying puffing characteristics.

EXAMPLE 3

A microwaveable food product of the present invention including barbeque seasoning was prepared by the procedure described in Example 2. The barbeque seasoning had the following composition:

| Ingredient | Weight % of the Composition |
| --- | --- |
| Sugar | 20.0 |
| Salt | 20.0 |
| HVP | 10.0 |
| Spices | 50.0 |

The barbeque seasoned food products had outstanding puffability. Inclusion of 5 to 15% of a seasoning did not impede the snack formation process of sheeting, forming and cutting and drying to 15% $H_2O$±3% facilitated the process. The microwaved food snacks had improved mouthfeel and texture.

Thus, while there have been described what are presently believed to be the preferred embodiments of the present invention, those skilled in the art will realize that other and further embodiments can be made without departing from the spirit and scope of the invention, and it is intended to include all such further modifications and changes as come within the true scope of the invention.

What is claimed is:

1. A method for preparing a food product having enhanced puffing characteristics, comprising:
   (a) preparing a mixture of a food product selected from the group consisting of potatoes, mung beans, wheat, corn, soy beans, rice, rice powders, tapioca bean starches and water;

(b) adding a first seasoning to the mixture;

(c) forming the mixture into a sheet;

(d) treating the sheet with steam at a temperature and for a time sufficient to form alpha latices; and (e) forming the steam treated sheet into shaped pieces. and drying the pieces to a moisture content in the range of from about 1% to about 20% by weight of the pieces.

2. The method of claim 1 wherein the moisture content of the pieces is from about 8% to about 15% by weight of the pieces.

3. The method of claim 1 wherein the moisture content of the pieces is from about 12% to about 14% by weight of the pieces.

4. The method of claim 1 wherein the moisture content of the pieces is from about 8% to about 12% by weight of the pieces.

5. The method of claim 1 wherein the moisture content of the pieces is about 12% by weight of the pieces.

6. The method of claim 1 wherein the food product is 100% potato starch.

7. The method of claim 1 wherein the seasoning is selected from the group consisting of salt, vinegar, barbeque seasoning, nacho seasoning, sour cream and onion seasoning, sweet and sour seasoning, sweet seasoning, hot seasoning, spicy seasoning, chicken flavor seasoning, savory flavor seasoning, MSG, HVP, and Yeast Autolysates.

8. The method of claim 1 wherein the sheet is cooled for two hours.

9. The method of claim 1 wherein the sheet is cut into square, rectangular or round pieces.

10. The method of claim 1 wherein the pieces are dried to a moisture content of 12 to 14%.

11. The method of claim 1 wherein the pieces have a thickness of from 0.4 to 2.0 mm.

12. The method of claim 9 wherein the pieces have a thickness in the range from 0.9 to 1.4 mm.

13. The method of claim 1 wherein the pieces are dried at a temperature in the range from 40 to 45° for a period of time from 2 to 2.5 hours.

14. A method for preparing a puffable food product having enhanced puffability comprising:

(a) mixing potato starch and water at a temperature in the range from 55 to 70° C. for a period of from 4 to 6 minutes;

(b) forming the mixture from step a) into a sheet:

(c) subjecting the sheet to steam at a temperature from 95 to 100° C. for a time from 5 to 7 minutes;

(d) cooling the sheets from step c);

(e) forming individual pieces of the food product in desired geometric shapes by cutting the sheets: and (f) subjecting the individual pieces to drying conditions to reduce the moisture content thereof to 8 to 15%.

* * * * *